United States Patent [19]

Sleight

[11] 4,027,004
[45] May 31, 1977

[54] RHENIUM OXIDES OF TYPES MReO₄ AND M'₂ReO₆

[75] Inventor: Arthur William Sleight, Kennett Square, Pa.

[73] Assignee: E. I. Du Pont de Nemours & Company, Wilmington, Del.

[22] Filed: May 10, 1976

[21] Appl. No.: 684,934

Related U.S. Application Data

[63] Continuation-in-part of Ser. No. 468,693, May 10, 1974, abandoned.

[52] U.S. Cl. ............................... 423/593; 423/594; 423/595; 423/600; 252/518; 252/519; 252/521
[51] Int. Cl.² ........................................ C01G 47/00
[58] Field of Search .......... 423/593, 594, 595, 600; 252/518, 519, 521

[56] References Cited

OTHER PUBLICATIONS

Sims et al., "Investigations of Rhenium–A Survey of the Literature", Battelle Memorial Institute, Ohio, 1952, pp. 63–70, 138, 141, 143.
Sleight et al., "Inorganic Chemistry," vol. 1, 1962, pp. 245–250.
Donohue et al., "Inorganic Chemistry" vol. 4, 1965, pp. 1152–1153.

*Primary Examiner*—Herbert T. Carter

[57] ABSTRACT

Novel rhenium oxides of the formulas $MReO_4$ and $M'_2ReO_6$, where M is Mg, Zn, Mn, Al, Ga, Fe, Co, or Ni and M' is Cr or Fe, are prepared by heating powder mixtures containing precursor oxides with or without some of the metals selected to give the proper stoichiometry, under a pressure of at least 25 kbars. The new oxides are useful in electrical elements, e.g., resistors.

15 Claims, No Drawings

RHENIUM OXIDES OF TYPES MReO$_4$ AND M'$_2$ReO$_6$

RELATIONSHIP TO OTHER APPLICATIONS

This application is a continuation-in-part of copending application Ser. No. 468,693, filed May 10, 1974 and now abandoned.

BACKGROUND OF THE INVENTION

1. Field of the Invention

This invention relates to certain novel mixed oxides of rhenium useful in electrical elements.

2. Prior Art

Few mixed oxides of rhenium are known. Understandably, these have involved the combination of the small, highly charged rhenium ion with large basic cations. Thus, with the large barium ion, compositions Ba$_2$MReO$_6$ are formed. These have a perovskite structure with the large Ba$^{+2}$ ions in 12-fold coordination while Re$^{+5}$ or Re$^{+6}$ shares 6-fold sites with the M$^{+3}$ or M$^{+2}$ cation. Another example is KReO$_4$ having the scheelite structure with the large K$^+$ ions in 8-fold coordination; see J. C. Morrow, Acta. Cryst. 13, 443–445 (1960). Still another example utilizes the relatively large Cd$^{+2}$ ion in 8-fold sites of the pyrochlore structure to form the electrically conductive Cd$_2$Re$_2$O$_7$ (Donohue et al., Inorg. Chem. 4, 1152–53 (1965).

SUMMARY OF THE INVENTION

According to the present invention there is provided ternary oxides of rhenium having the formula (1) MReO$_4$ where M is selected from the group consisting of Mg, Zn, Mn, Al, Ga, Fe, Co and Ni or (2) M'$_2$ReO$_6$ wherein M' is Cr or Fe.

There is also provided a process for preparing the aforesaid rhenium oxides which comprises heating together appropriate proportions of rhenium oxide and at least one of the oxides of M or M' and appropriate proportions of whichever of the metals Re, M and M' are necessary to provide the stoichiometry of the product, at a temperature of at least about 800° C and a pressure of at least about 25 kbars.

Also provided is an electrical element formed from a material containing at least one of the aforesaid rhenium oxides.

These new rhenium oxides are compounds wherein rhenium shares with another ion of comparable size the octahedral sites of a close-packed oxygen lattice. Rhenium oxides of the present stoichiometry have been unknown heretofore. The new compounds all have rutile-related structures, are synthesized under pressure and are useful in electrical resistor compositions.

The products are all dark (black or nearly so), crystalline solids which can be readily characterized by their stoichiometry and by their X-ray diffraction patterns. The patterns may all be indexed as belonging to structures related to the well-known rutile structure of TiO$_2$. Further, the structures are in most cases of the same type as that of the analogous tungstate.

DESCRIPTION OF PREFERRED EMBODIMENTS

MgReO$_4$, ZnReO$_4$ and MnReO$_4$ are isostructural with the corresponding tungstates of those elements and have the wolframite structure. Using the unit cell dimensions reported here in conjunction with the well-known wolframite pattern (e.g., for MnWO$_4$ as given by ASTM card 13–434), the characteristic X-ray pattern of each of the new compounds may be generated.

AlReO$_4$, GaReO$_4$ and FeReO$_4$ have the structure of the rutile prototype in which the octahedral cation sites occupied by Ti in the prototype TiO$_2$ are shared in a statistical fashion by Re and the other cation of Al, Ga or Fe. The X-ray pattern is readily generated by using the unit-cell dimensions indicated below in conjunction with the pattern of the isostructural, known compound FeTaO$_4$ (see ASTM card 23–305). With Al and Ga, rhenium undoubtedly has a formal valence of +5 similar to Ta. In FeReO$_4$, no certain distribution of valence between Fe and Re is assured.

The new compounds CoReO$_4$ and NiReO$_4$ each crystallize in a slight orthorhombic distortion of the rutile structure similar to that observed for PtO$_2$ (ASTM card 21–613).

The X-ray pattern of Cr$_2$ReO$_6$ is characteristic of a trirutile structure like that of its tungsten analog Cr$_2$WO$_6$ (ASTM card 13–110). Similarly the new compound Fe$_2$ReO$_6$ has a pattern like that of its tungsten analog Fe$_2$WO$_6$ (ASTM card 20–539).

All of the new compounds can be prepared by heating together the binary oxides and metals in amounts appropriate to the desired stoichiometry. In order to maintain rhenium in the less common valence of +6 or +5 and in the structures reported here, the proper oxygen proportion as well as the proportion of metals must be maintained by use of a closed, high-pressure system. Pressures of about 25 kbars (1 kbar = 1000 atmospheres) or above, preferably 50 kbars or above, are used. Reaction temperature is at least 800° C. It is preferred to use a temperature of about 1200°–1300° C in order to facilitate reaction between the finely divided solid reactants, which should first be intimately mixed. The reaction is conveniently carried out in an evacuated and sealed platinum container to avoid contamination. It is preferred to maintain the pressure of at least 25 kbars from before heating until after rapid cooling of the product in order to minimize possible dissociation of the compounds at lower pressure.

A convenient method for carrying out the high pressure reaction, and the one employed in the examples below, is by means of a tetrahedral anvil device such as described by E. C. Lloyd et al., Jour. of Res., Nat. Bureau Stds. 63C, 59 (1959).

All of these new ternary rhenium oxides have electrical conductivities in the range useful as components of electrical resistors. Measurement on single crystals and pressed compacts of the pure compounds indicates a resistivity span from less than 10$^{-3}$ ohm-cm. to over 10$^4$ ohm-cm. Practical resistor compositions can be prepared by mixing one or more of the finely powdered oxides with a binder that aids consolidation into the desired shape, or by incorporation into a fluid vehicle that permits the use of silk screening techniques to form a conductive array. A particularly preferred resistor composition consists of about 20–80% by weight of a rhenium oxide (or oxides), about 15–75% by weight of a glass binder and about 5–30% by weight of gold or silver. One skilled in the art will have no difficulty in selecting useful binders and/or vehicles for resistor applications. Selection depends on the nature of the substrate, the desired temperature of application and the use conditions as well as other factors. With these new compositions, the use of a low-melting glass serves not only to bind the oxide particles but in addition protects them from excessive degradation at high temperature.

EXAMPLE 1

FeReO$_4$ 0.3992g. of Fe$_2$O$_3$, 0.9758g. of ReO$_3$, and 0.1552g. of Re metal were mixed by grinding in a mortar. These reactants were then heated at 1300° C for 2 hrs. under 58 kbars pressure. The black product was weakly magnetic.

Analysis of the X-ray diffraction pattern obtained from the product and comparison of this pattern with that shown on Powder Diffraction File Card No. 23–305 for FeTa$_2$O$_4$ indicated that the major phase, FeReO$_4$, was of the rutile-type FeTaO$_4$ structure with $a$ = 4.67A and $c$ = 2.93A. The X-ray diffraction pattern for FeReO$_4$ is shown in Table I. The electrical resistivity of a single crystal of the FeReO$_4$ product was found to be 8 × 10$^{-4}$ ohm-cm at room temperature.

TABLE I

X-RAY DIFFRACTION PATTERN FOR FeReO$_4$

| Reflection hkl | d Spacings Calculated, A | d Spacings Observed, A | Intensity Observed |
|---|---|---|---|
| 100 | 4.670 | 4.689 | W |
| 110 | 3.302 | 3.292 | S+ |
| 101 | 2.482 | 2.473 | S− |
| 200 | 2.335 | 2.331 | M |
| 111 | 2.192 | 2.186 | W |
| 211 | 1.701 | 1.698 | S |
| 220 | 1.651 | 1.650 | M |
| 310 | 1.477 | 1.476 | M |
| 002 | 1.465 | 1.460 | W |
| 301 | 1.375 | 1.374 | M |
| 112 | 1.339 | 1.336 | W+ |
| 202 | 1.241 | 1.239 | W+ |
| 321 | 1.185 | 1.184 | W+ |
| 400 | 1.167 | 1.168 | W |
| 330 | 1.101 | 1.101 | W |
| 222 | 1.096 | 1.094 | W+ |
| 411 | 1.056 | 1.057 | W+ |
| 420 | 1.044 | 1.045 | W |
| 312 | 1.040 | 1.039 | W+ |
| 510 | 0.916 | 0.917 | W |
| 402 | 0.913 | 0.913 | W |
| 501, 431 | 0.890 | 0.890 | W+ |
| 213 | 0.885 | 0.883 | W |
| 332 | 0.880 | 0.880 | W+ |
| 422 | 0.850 | 0.850 | W+ |
| 521 | 0.832 | 0.832 | W+ |
| 440 | 0.826 | 0.826 | W+ |
| 512 | 0.777 | 0.777 | M |

EXAMPLE 2

AlReO$_4$ 0.3398g. of Al$_2$O$_3$, 1.3010g. of ReO$_3$ and 0.2069g. of Re metal were mixed by grinding in a mortar. These reactants were then heated at 1300° C for 4 hrs. under 58 kbars pressure. Analysis of the X-ray diffraction pattern obtained from the black product and comparison of this pattern with that shown on Powder Diffraction File Card No. 23–305 for FeTaO$_4$ indicated that the major phase was AlReO$_4$ of the rutile-type FeTaO$_4$ structure with $a$ = 4.64A and $c$ = 2.80A. The X-ray diffraction pattern for AlReO$_4$ is shown in Table II. The electrical resistivity of a pellet of AlReO$_4$ was found to be 2 ohm-cm at room temperature.

TABLE II

X-RAY DIFFRACTION PATTERN FOR AlReO$_4$

| Reflection hkl | d Spacings Calculated, A | d Spacings Observed, A | Intensity Observed |
|---|---|---|---|
| 100 | 4.640 | 4.576 | M |
| 110 | 3.281 | 3.279 | S |
| 001 | 2.800 | 2.794 | W |
| 101 | 2.397 | 2.396 | S |
| 200 | 2.320 | 2.317 | M+ |
| 111 | 2.130 | 2.136 | M |
| 210 | 2.075 | 2.088 | W |
| 201 | 1.786 | 1.769 | W |
| 211 | 1.667 | 1.666 | S |
| 220 | 1.640 | 1.638 | M+ |
| 310 | 1.467 | 1.466 | M |
| 002 | 1.400 | 1.401 | M− |
| 301 | 1.354 | 1.353 | M |
| 102 | 1.340 | 1.336 | W− |
| 112 | 1.288 | 1.289 | M |
| 202 | 1.199 | 1.199 | W+ |
| 321 | 1.169 | 1.168 | M |
| 400 | 1.160 | 1.159 | W− |
| 330 | 1.094 | 1.093 | W |
| 222 | 1.065 | 1.065 | M |
| 411 | 1.044 | 1.044 | M |
| 302, 420 | 1.038 | 1.037 | W |
| 312 | 1.013 | 1.013 | M |

EXAMPLE 3

GaReO$_4$ 0.374g. of Ga$_2$O$_3$, 0.7807g. of ReO$_3$, and 0.1561g. of Re metal were mixed by grinding in a mortar. These reactants were then heated at 1200° C for 3 hrs. under 58 kbars pressure. Analysis of the X-ray diffraction pattern obtained from the dark violet product and comparison of this pattern with that shown on Powder Diffraction File Card No. 23–305 for FeTaO$_4$ indicated that the major phase was GaReO$_4$ of the rutile-type FeTaO$_4$ structure with $a$ = 4.69A and $c$ = 2.85A. The X-ray diffraction pattern for GaReO$_4$ is shown in Table III. The electrical resistivity of a pellet of the GaReO$_4$ product was 5 ohm-cm at room temperature.

TABLE III

X-RAY DIFFRACTION PATTERN FOR GaReO$_4$

| Reflection hkl | d Spacings Calculated, A | d Spacings Observed, A | Intensity Observed |
|---|---|---|---|
| 100 | 4.690 | 4.670 | W |
| 110 | 3.316 | 3.317 | S |
| 101 | 2.436 | 2.436 | S+ |
| 200 | 2.345 | 2.346 | M |
| 111 | 2.161 | 2.162 | W |
| 211 | 1.689 | 1.690 | S |
| 220 | 1.658 | 1.659 | W |
| 300 | 1.563 | 1.566 | W− |
| 310 | 1.483 | 1.484 | W |
| 221 | 1.433 | 1.438 | W |
| 002 | 1.425 | 1.425 | W |
| 301 | 1.371 | 1.371 | M |
| 112 | 1.309 | 1.310 | W+ |

EXAMPLE 4

ZnReO$_4$ 0.3255g. of ZnO and 0.9368g. of ReO$_3$ were mixed by grinding in a mortar. These reactants were then heated at 1300° C for 1 hr. under 58 kbars pressure. Analysis of the X-ray diffraction pattern obtained from the black product and comparison of this pattern with that shown on Powder Diffraction File Card No. 13–434 for MnWO$_4$ indicated that the major phase was ZnReO$_4$ of the monoclinic wolframite-type structure with $a$ = 4.70A, $b$ = 5.60A, $c$ = 5.03A and $\beta$ = 91.30°. The X-ray diffraction pattern for ZnReO$_4$ is shown in Table IV. The electrical resistivity of a pellet of the resulting ZnReO$_4$ was found to be 60,000 ohm-cm at room temperature.

TABLE IV

X-RAY DIFFRACTION PATTERN FOR ZnReO$_4$

| Reflection hkl | d Spacings Calculated, A | d Spacings Observed, A | Intensity Observed |
|---|---|---|---|
| 010 | 5.600 | 5.605 | M− |
| 100 | 4.699 | 4.694 | S |
| 011 | 3.742 | 3.742 | S |
| 110 | 3.600 | 3.599 | S |
| 101 | 3.395 | 3.398 | W |
| 1̄11 | 2.951 | 2.950 | S+ |
| 111 | 2.903 | 2.903 | S+ |
| 020 | 2.800 | 2.804 | M |
| 002 | 2.514 | 2.512 | M+ |
| 021 | 2.446 | 2.450 | S |
| 120 | 2.405 | 2.407 | W− |
| 200 | 2.349 | 2.348 | M− |
| 012 | 2.294 | 2.293 | W− |
| 1̄02 | 2.238 | 2.236 | M |
| 102 | 2.196 | 2.193 | W |
| 1̄21 | 2.180 | 2.181 | W− |
| 121 | 2.166 | 2.162 | M |
| 1̄12 | 2.078 | 2.077 | W+ |
| 112 | 2.045 | 2.043 | W+ |

EXAMPLE 5

MgReO$_4$ 0.1612g. of MgO and 0.9368g. of ReO$_3$ were mixed by grinding in a mortar. These reactants were then heated at 1300° C for 1 hr. under 58 kbars pressure. Analysis of the X-ray diffraction pattern obtained from the black product and comparison of this pattern with that shown on Powder Diffraction File Card. No. 13–434 for MnWO$_4$ indicated that the major phase was MgReO$_4$ of the monoclinic wolframite, structure with $a = 4.69A$, $b = 5.57A$, $c = 5.07A$ and $\beta = 92.0°$. The X-ray diffraction pattern for MgReO$_4$ is shown in Table V. The electrical resistivity of a pellet of the resulting MgReO$_4$ was found to be 40,000 ohm-cm.

TABLE V

X-RAY DIFFRACTION PATTERN FOR MgReO$_4$

| Reflection hkl | d Spacings Calculated, A | d Spacings Observed, A | Intensity Observed |
|---|---|---|---|
| 010 | 5.570 | 5.576 | M |
| 100 | 4.687 | 4.691 | S+ |
| 011 | 3.748 | 3.726 | S |
| 110 | 3.586 | 3.587 | M |
| 1̄11 | 2.965 | 2.953 | M+ |
| 111 | 2.891 | 2.878 | S |
| 020 | 2.785 | 2.788 | W |
| 002 | 2.533 | 2.503 | M |
| 021 | 2.441 | 2.436 | W |
| 120 | 2.394 | 2.395 | W |

EXAMPLE 6

MnReO$_4$ 0.1449g. of MnO$_2$, 0.0916g. of Mn metal, and 0.7807g. of ReO$_3$ were mixed by grinding in a mortar. These reactants were then heated at 1200° C for 4 hrs. under 58 kbars of pressure. Analysis of the X-ray diffraction pattern run on a different sample prepared in the same manner and comparison of this pattern with that shown on Powder Diffraction File Card No. 13–434 for MnWO$_4$ indicated that the major phase of the black product was MnReO$_4$ of the monoclinic wolframite-type structure with $a = 4.80A$, $b = 5.63A$, $c = 5.08A$ and $\beta = 92.73°$. The X-ray diffraction pattern for MnReO$_4$ is shown in Table VI. The electrical resistivity of a single crystal of the MnReO$_4$ product was found to be 2 ohm-cm at room temperature.

TABLE VI

X-RAY DIFFRACTION PATTERN FOR MnReO$_4$

| Reflection hkl | d Spacings Calculated, A | d Spacings Observed, A | Intensity Observed |
|---|---|---|---|
| 010 | 5.630 | 5.630 | M |
| 1̄00 | 4.797 | 4.795 | M+ |
| 011 | 3.768 | 3.767 | M+ |
| 1̄10 | 3.651 | 3.653 | M+ |
| 1̄11 | 3.015 | 3.015 | S+ |
| 111 | 2.913 | 2.913 | S |
| 020 | 2.815 | 2.815 | W |
| 002 | 2.535 | 2.535 | M |
| 021 | 2.461 | 2.461 | M |
| 012 | 2.428 | 2.428 | W− |
| 2̄00 | 2.398 | 2.398 | W+ |
| 0̄12 | 2.312 | 2.312 | W− |
| 1̄02 | 2.287 | 2.287 | W+ |
| 1̄21 | 2.211 | 2.210 | W |
| 102 | 2.199 | 2.199 | W− |
| 121 | 2.169 | 2.169 | M− |
| 1̄12 | 2.119 | 2.118 | W |
| 2̄11 | 2.056 | 2.056 | W |
| 112 | 2.048 | 2.048 | W |
| 211 | 1.991 | 1.991 | W |

EXAMPLE 7

NiReO$_4$ 0.2988g. of NiO and 0.9368g. of ReO$_3$ were mixed by grinding in a mortar. These reactants were then heated at 1300° C for 3 hrs. under 58 kbars pressure. The product was black. Analysis of the X-ray diffraction pattern run on a different sample prepared in the same manner and comparison of this pattern with that shown on Powder Diffraction File Card No. 21–613 for PtO$_2$ indicated that the major phase was NiReO$_4$ of the distorted rutile-type structure similar to that of PtO$_2$ with $a = 4.63A$, $b = 4.68A$, and $c = 2.89A$. The X-ray diffraction pattern for NiReO$_4$ is shown in Table VII. The electrical resistivity of a pellet of the NiReO$_4$ product was found to be 8 ohm-cm at room temperature.

TABLE VIII

X-RAY DIFFRACTION PATTERN FOR NiReO$_4$

| Reflection hkl | d Spacings Calculated, A | d Spacings Observed, A | Intensity Observed |
|---|---|---|---|
| 010 | 4.680 | 4.677 | S− |
| 100 | 4.630 | 4.626 | M+ |
| 110 | 3.291 | 3.292 | S+ |
| 001 | 2.890 | 2.893 | M |
| 011 | 2.459 | 2.460 | S |
| 101 | 2.452 | 2.453 | S |
| 020 | 2.340 | 2.339 | M |
| 200 | 2.315 | 2.313 | M |
| 1-11 | 2.172 | 2.193 | M+ |
| 021 | 1.819 | 1.819 | M− |
| 201 | 1.807 | 1.807 | W+ |
| 211 | 1.686 | 1.680 | M |
| 002 | 1.445 | 1.445 | M− |

EXAMPLE 8

CoReO$_4$ 0.2408g. of Co$_3$O$_4$, 0.9368g. of ReO$_3$, and 0.0589g. of Co metal were mixed by grinding in a mortar. These reactants were then heated at 1200° C for 4 hrs. under 58 kbars of pressure. The product was black. Analysis of the X-ray diffraction pattern run on a different sample prepared in the same manner and comparison of this pattern with that shown on Powder Diffraction File Card No. 21–613 for PtO$_2$ indicated that the major phase was CoReO$_4$ of the distorted rutile-type structure similar to that of PtO$_2$ with $a = 6.50A$, $b = 6.73A$, and $c = 2.88$A. The X-ray diffraction pattern for $CoReO_4$ is shown in Table VIII. The electrical resistivity of a pellet of the $CoReO_4$ product was 9 ohm-cm at room temperature.

TABLE VIII

X-RAY DIFFRACTION PATTERN FOR $CoReO_4$

| Reflection hkl | d Spacings Calculated, A | d Spacings Observed, A | Intensity Observed |
|---|---|---|---|
| 110 | 4.675 | 4.673 | M+ |
| 020 | 3.365 | 3.366 | S |
| 200 | 3.250 | 3.251 | S |
| 001 | 2.880 | 2.881 | M− |
| 111 | 2.452 | 2.454 | S+ |
| 220 | 2.338 | 2.329 | M− |
| 021 | 2.188 | 2.189 | M |
| 130 | 2.121 | 2.121 | W |
| 310 | 2.062 | 2.067 | W |
| 221 | 1.815 | 1.820 | W |
| 131 | 1.708 | 1.710 | M+ |
| 040 | 1.683 | 1.680 | M+ |
| 311 | 1.677 | | |
| 400 | 1.625 | 1.628 | M |
| 330 | 1.558 | 1.552 | W |

EXAMPLE 9

$Fe_2ReO_6$ 0.7985g. of $Fe_2O_3$ and 1.1710g. of $ReO_3$ were mixed by grinding in a mortar. These reactants were then heated at 1300° C for 2 hrs. under 58 kbars pressure. Analysis of the X-ray diffraction pattern obtained from the black product and comparison of this pattern with that shown on Powder Diffraction File Card No. 20–539 for $Fe_2WO_6$ indicated the major phase, $Fe_2ReO_6$, to be isostructural with $Fe_2WO_6$. The orthorhombic cell dimensions reported for $Fe_2WO_6$ are: $a = 4.58$A, $b = 16.77$A and $c = 4.97$A; for $Fe_2ReO_6$, $a = 4.54$A, $b = 16.63$A, and $c = 4.97$A. The X-ray diffraction pattern for $Fe_2ReO_6$ is shown in Table IX. The electrical resistivity of a pellet of the $Fe_2ReO_6$ product was found to be 3 ohm-cm at room temperature.

TABLE IX

X-RAY DIFFRACTION PATTERN FOR $Fe_2ReO_6$

| Reflection hkl | d Spacings Calculated, A | d Spacings Observed, A | Intensity Observed |
|---|---|---|---|
| 110 | 4.381 | 4.376 | M |
| 021 | 4.268 | 4.258 | M+ |
| 040 | 4.158 | 4.148 | M− |
| 130 | 3.513 | 3.509 | M+ |
| 111 | 3.287 | 3.283 | M− |
| 041 | 3.190 | 3.185 | W |
| 131 | 2.869 | 2.868 | S+ |
| 060 | 2.772 | 2.771 | M− |
| 150 | 2.684 | 2.684 | M− |
| 002 | 2.486 | 2.484 | M |
| 061 | 2.421 | 2.420 | M+ |
| 151 | 2.36 | 2.360 | W |
| 200 | 2.271 | 2.270 | M− |
| 112 | 2.162 | 2.161 | W+ |
| 161 | 2.136 | 2.136 | M− |
| 080 | 2.079 | 2.080 | W |
| 132 | 2.029 | 2.029 | M |
| 221 | 2.005 | 2.003 | W+ |
| 240 | 1.993 | 1.994 | W |

EXAMPLE 10

$Cr_2ReO_6$ 0.4001g. of $Cr_2O_3$ and 0.6163g. of $ReO_3$ were mixed by grinding in a mortar. These reactants were then heated at 1300° C for 1 hr. under 58 kbars pressure. Analysis of the X-ray diffraction pattern obtained from the black product and comparison of this pattern with that shown on Powder Diffraction File Card No. 13–110 for $Cr_2WO_6$ indicated that the major phase, $Cr_2ReO_6$, had the trirutile structure with $a = 4.55$A and $c = 8.81$A and to be isostructural with $Cr_2WO_6$. The X-ray diffraction pattern for $Cr_2ReO_6$ is shown in Table X. The electrical resistivity of a pellet of the $Cr_2ReO_6$ product was 10 ohm-cm at room temperature.

TABLE X

X-RAY DIFFRACTION PATTERN FOR $Cr_2ReO_6$

| Reflection hkl | d Spacings Calculated, A | d Spacings Observed, A | Intensity Observed |
|---|---|---|---|
| 002 | 4.455 | 4.456 | M |
| 101 | 4.052 | 4.054 | S |
| 110 | 3.217 | 3.221 | S+ |
| 112 | 2.608 | 2.608 | M |
| 103 | 2.487 | 2.484 | S |
| 200 | 2.275 | 2.277 | M+ |
| 113 | 2.182 | 2.181 | M |
| 202 | 2.026 | 2.025 | M− |
| 211 | 1.984 | 1.983 | M |
| 114 | 1.831 | 1.831 | M− |
| 213 | 1.679 | 1.678 | S |
| 105 | 1.659 | 1.659 | W |
| 220 | 1.609 | 1.608 | M |
| 204 | 1.592 | 1.591 | W |
| 222 | 1.513 | 1.512 | W− |

EXAMPLE 11

Resistor Comprising $MnReO_4$

A powder mixture was prepared by grinding together 50 percent by weight of $MnReO_4$ (prepared as described in Example 6), 25 percent by weight of gold powder and 25 percent by weight of a low-melting sodium borosilicate glass powder (glass micro-ballons, Tg = 482° C). The mixture was pressed into a pellet and heated for 5 minutes at 500° C to fuse it. The resulting pellet resistor had a resistivity of 1200 ohm-cm when measured at room temperature.

EXAMPLE 12

Resistor comprising $Cr_2ReO_6$

A powder mixture was prepared by grinding together 50 percent by weight of $Cr_2ReO_6$ (prepared as described in Example 10), 25 percent by weight of gold powder and 25 percent by weight of a low-melting sodium borosilicate glass powder (glass micro-balloons, Tg = 482° C). The mixture was pressed into a pellet and heated for 5 minutes at 500° C to fuse it. The resulting pellet resistor had a resistivity of 850 ohm-cm when measured at room temperature.

What is claimed is:

1. A compound of the group consisting of $MReO_4$ and $M'_2ReO_6$, wherein M is Mg, Zn, Mn, Al, Ga, Fe, Co, or Ni and M' is Cr or Fe.
2. The compound of claim 1, $FeReO_4$.
3. The compound of claim 1, Al $ReO_4$.
4. The compound of claim 1, $GaReO_4$.
5. The compound of claim 1, $ZnReO_4$.
6. The compound of claim 1, $MgReO_4$.
7. the compound of claim 1, $MnReO_4$.
8. The compound of claim 1, $NiReO_4$.
9. The compound of claim 1, $CoReO_4$.
10. The compound of claim 1, $Fe_2ReO_6$.
11. The compound of claim 1, $Cr_2ReO_6$.
12. The process of preparing a compound of claim 1 which comprises heating together appropriate proportions of rhenium oxide and at least one of the oxides of M or M' and appropriate proportions of whichever of the metals Re, M and M' are necessary to provide the stoichiometry of the product, at a temperature of at least about 800° C and a pressure of at least about 25 kbars.

13. The process of claim 12 wherein $Fe_2O_3$, $ReO_3$ and Re are employed and the product is $FeReO_4$.

14. The process of claim 12 wherein $MnO_2$, Mn, and $ReO_3$ are employed and the product is $MnReO_4$.

15. The process of claim 12 wherein $Cr_2O_3$ and $ReO_3$ are employed and the product is $Cr_2ReO_6$.

* * * * *